UNITED STATES PATENT OFFICE.

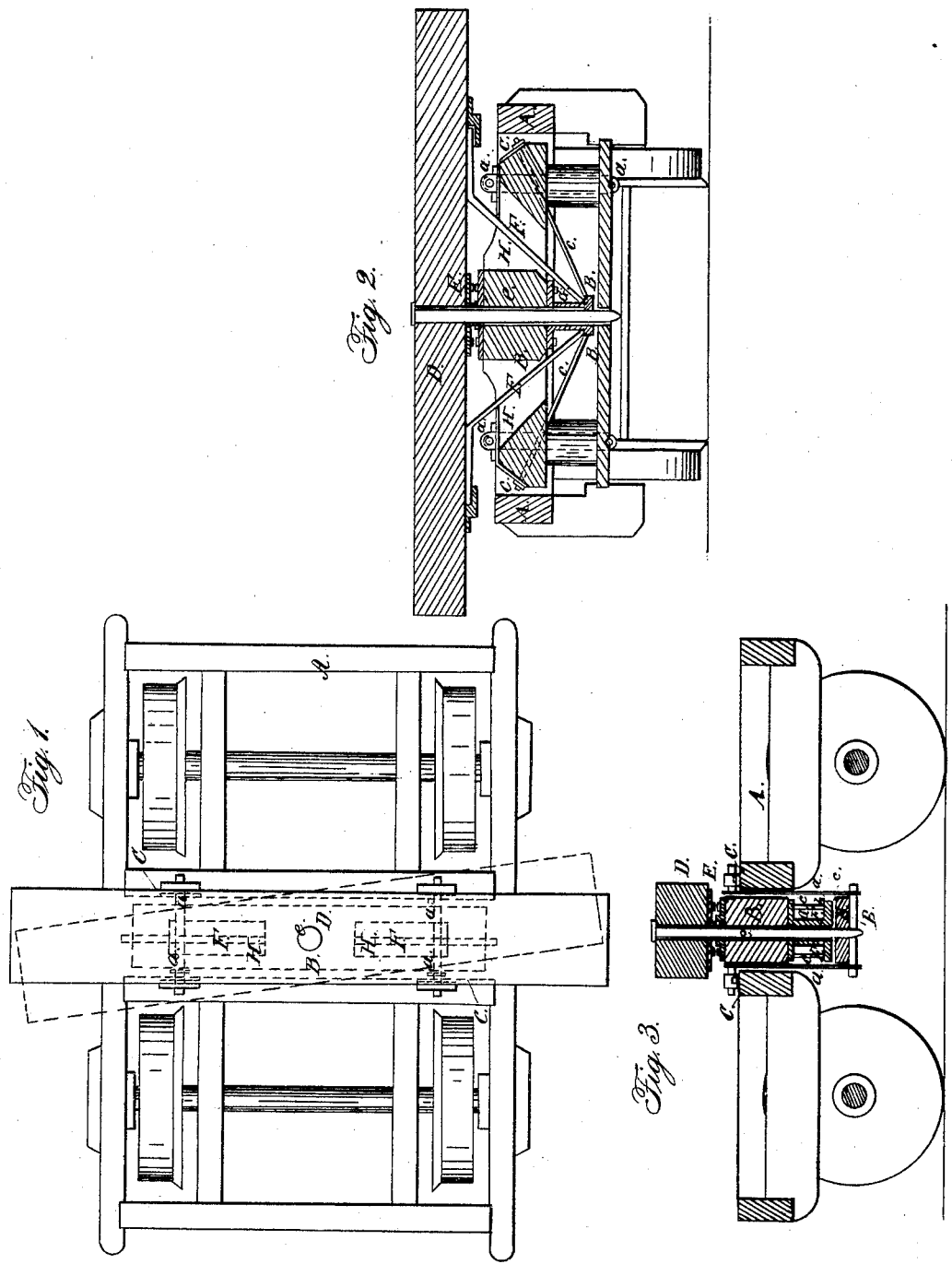

T. F. ALLEN, OF DYERSVILLE, IOWA.

RAILROAD-CAR TRUCK.

Specification of Letters Patent No. 23,336, dated March 29, 1859.

*To all whom it may concern:*

Be it known that I, T. F. ALLEN, of Dyersville, in the county of Dubuque and State of Iowa, have invented a new and useful Improvement in Car-Trucks; and I do hereby declare that the following is a full, clear, and exact description of the same, reference being had to the accompanying drawings, forming a part of this specification, in which—

Figure 1, is a plan or top view of a railroad car truck with my improvements applied to it. Fig. 2, is a vertical transverse section of the same, and Fig. 3, is a vertical longitudinal section of the same.

Similar letters of reference, in each of the several figures indicate corresponding parts.

Before stating the nature of my invention, I deem it proper to mention some of the difficulties experienced from the present modes of constructing car trucks.

In all car-trucks with which I am familiar, side or corner bearings, additional to the central bearing, for the car-body to rest and balance upon, are necessarily provided, and therefore, whenever the trucks are inclined to swivel or adapt themselves to the various curvatures of roads, there is always a great amount of friction to be overcome at said side bearing, and at particular times when the flange of the outside wheel has fairly approached the rail, the natural inclination of the truck is to adapt itself to the curve, but it is often the case that trucks are held rigidly to their position by the great amount of friction that is thrown upon the side bearing by reason of a sudden lurching of the car body or load, and just at this particular time if the end of one rail should partially project beyond that of the other, the car will most likely be thrown from the track. Side bearings are also objectionable from their requiring to be placed so nearly over the wheels that the concussion, caused by the wheels passing over the joints and imperfect places in the rails, is immediately imparted to the car body and reacts upon the truck frame, causing at the same time, a disagreeable vibration in the cars and an extra amount of wear and tear both of truck and car body.

My improvements, it is thought, will effectually remedy the foregoing objections, without adding materially to the weight and expense of car trucks.

The nature of my invention consists in a car truck sustaining the weight of the car-body upon the center in a manner to perfectly balance or keep it in equilibrium and free from contact with the side timbers of the truck frame whatever be the motion imparted to it, and yet provide but the one common central axis or bearing, for it to turn upon.

My arrangement, besides balancing the car body, as just stated, also allows the trucks great freedom to adapt themselves to the curves of the track, as no friction from side bearings is experienced, and whenever concussions occur, the effect of the same will come upon the central axis and consequently be equally distributed throughout the car in a manner to save the passengers from much of the disagreeable jarring experienced in cars hung in the ordinary way, and likewise the car body and truck from the serious wear and tear consequent from said jarring.

To enable others, skilled in the art, to make and use my invention, I will proceed to describe its construction and operation.

A, represents a car truck very similar in construction to those at present in use.

B, is an auxiliary frame suspended by swinging brackets $a$, $a$, in a central transverse opening C, of the truck frame A, so as to be capable of vibrating laterally or so as to allow the truck frame to move laterally independently of it. To this frame, the transverse bolster D, of the car body is attached by means of the central axial pin or bolt $e$, an ordinary "transom" plate E, and diagonal braces F, F, as shown. The king-bolt passes down through the frame B, said frame being provided with a metal tubular bearing box G, which encircles the pin, said box being furnished with a flanch $b$, at its lower end, and stayed and held in place by means of diagonal rods $c$, $c$. The diagonal braces F, are attached by their upper ends fast to the underside of the car body bolster D, at points some distance from the central or king bolt, and by their lower ends loosely to the box or bearing of the king bolt, this latter attachment being effected by forming a semicircular ring on each lower end of the braces and having said ring loosely encircle the tubular bearing box G, above the flanch $b$. It is by thus attaching the bolster D, of the car-body to the swinging frame by means of an axial pin or king bolt, and diagonal braces, that I obtain a support for the car at its center, and on each side of the center, without the necessity of providing side bearings on the truck frame A, for the car body to rest, vibrate and rub against. The diagonal braces answering all the ends gained by side bearings, and avoiding all the defects of the same, as they receive the weight when concussion or jars occur and transfer it directly to the center, and thus effect an equal distribution of the same throughout the car in a manner to avoid much of the disagreeable sensation felt by the passengers in cars in use, and the wear and tear to the cars and trucks. The diagonal rods also, by being fitted to turn loosely on the tubular bearing box, and passing up through open spaces H, H, of the auxiliary or swinging suspension frame B, allow the truck great freedom to turn independently of the car body, and thus adapt itself to the curvatures of the road. It is by thus providing for the turning of the trucks while they are supported free from contact with side bearings of the truck frame, that I avoid the disastrous accidents from the cars running off the track while turning curves, and when the rails are slightly out of repair or proper position, as set forth in the fore-part of this specification.

What I claim as my invention, and desire to secure by Letters Patent, is—

A car truck sustaining the weight of the car body upon the center in a manner to balance or keep it in equilibrium and free from contact with the side timbers of the truck frame, whatever be the motion imparted to it, and yet provide but the one common central axis or bearing, for it to turn upon, substantially as described and for the purposes set forth.

T. F. ALLEN.

Witnesses:
G. YORKE ATLEE,
L. EIKENBERRY.